United States Patent
Choi et al.

(10) Patent No.: US 12,435,979 B2
(45) Date of Patent: Oct. 7, 2025

(54) LOW-POWER METHOD AND MAP DATA HIERARCHICAL SEGMENTATION LOAD METHOD FOR INDOOR POSITIONING

(71) Applicant: Korea University Research and Business Foundation, Seoul (KR)

(72) Inventors: Lynn Choi, Seoul (KR); Han Jun Bae, Seoul (KR)

(73) Assignee: Korea University Research and Business Foundation, Seoul (KR)

(*) Notice: Subject to any disclaimer, the term of this patent is extended or adjusted under 35 U.S.C. 154(b) by 0 days.

(21) Appl. No.: 17/923,826

(22) PCT Filed: Jan. 4, 2022

(86) PCT No.: PCT/KR2022/000062
§ 371 (c)(1),
(2) Date: Nov. 7, 2022

(87) PCT Pub. No.: WO2023/022311
PCT Pub. Date: Feb. 23, 2023

(65) Prior Publication Data
US 2024/0219180 A1    Jul. 4, 2024

(30) Foreign Application Priority Data
Aug. 19, 2021  (KR) .................. 10-2021-0109381

(51) Int. Cl.
*G01C 21/12*    (2006.01)
*G01C 21/00*    (2006.01)
*G01C 21/20*    (2006.01)

(52) U.S. Cl.
CPC ........... *G01C 21/12* (2013.01); *G01C 21/206* (2013.01); *G01C 21/383* (2020.08)

(58) Field of Classification Search
CPC ..... G01C 21/12; G01C 21/383; G01C 21/206
See application file for complete search history.

(56) References Cited

U.S. PATENT DOCUMENTS

| | | | |
|---|---|---|---|
| 2014/0213298 A1* | 7/2014 | Marti .................. | H04W 4/023 455/456.3 |
| 2017/0248424 A1 | 8/2017 | Park et al. | |

(Continued)

FOREIGN PATENT DOCUMENTS

| KR | 10-1309291 B1 | 9/2013 |
|---|---|---|
| KR | 10-2015-0059410 A | 6/2015 |

(Continued)

OTHER PUBLICATIONS

Pedestrian Indoor Navigation for Complex Public Facilities, Czogalla et al, IEEE Oct. 2016 (Year: 2016).*

(Continued)

*Primary Examiner* — Navid Z. Mehdizadeh
*Assistant Examiner* — Oliver Tan
(74) *Attorney, Agent, or Firm* — NSIP Law

(57) ABSTRACT

Disclosed is a low power and low memory based indoor positioning method performed by a computing device including at least one processor. The method may include: determining an operation mode to be executed based on at least one of a motion of a target and movement of the target; loading a map segment related to a current location of the target from a memory when executing a specific mode related to performing indoor positioning; and acquiring positioning data by using sensing data collected in real time for the indoor positioning, and the map segment.

13 Claims, 9 Drawing Sheets

(56) References Cited

U.S. PATENT DOCUMENTS

2017/0336210 A1* 11/2017 Rahman .................. H04W 4/33
2019/0234744 A1    8/2019 Wang et al.
2021/0318963 A1* 10/2021 Kim .................... G06F 12/0246
2021/0394020 A1* 12/2021 Killen ................ A63B 24/0006

FOREIGN PATENT DOCUMENTS

KR    10-2016-0090199 A    7/2016
KR    10-2017-0100281 A    9/2017
KR        10-1871052 B1    6/2018

OTHER PUBLICATIONS

Multi-Floor Indoor Pedestrian Dead Reckoning with a Backtracking Particle Filter and Viterbi-Based Floor Number Detection, De Cock et al, MDPI Jul. 2021 (Year: 2021).*
Korean Office Action Issued on Mar. 28, 2024, in Counterpart Korean Patent Application No. 10-2021-0109381 (5 Pages in Korean).
Extended European Search Report issued on May 20, 2025, in counterpart European Patent Application No. 22799837.4.(10pages in English).

* cited by examiner

[FIG. 1]
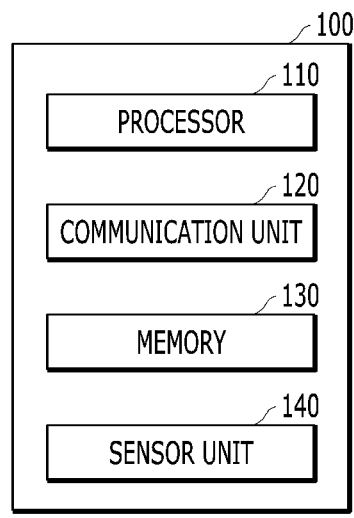

[FIG. 2]
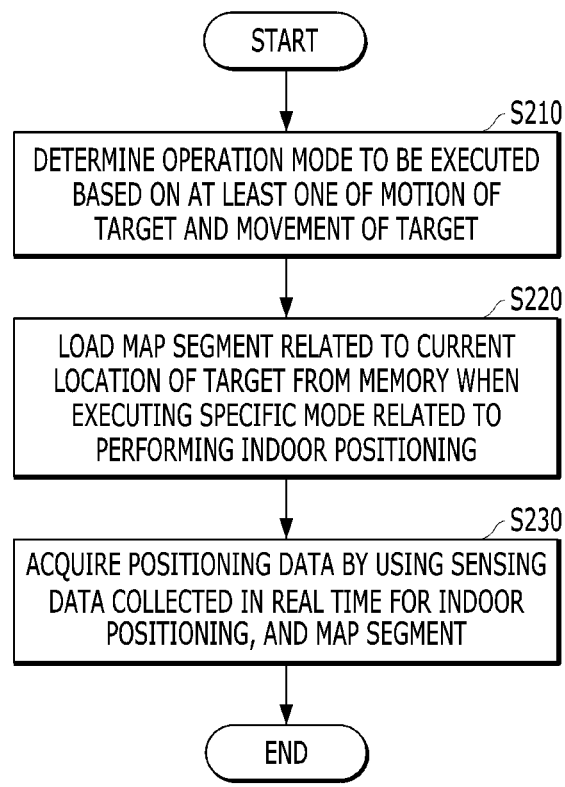

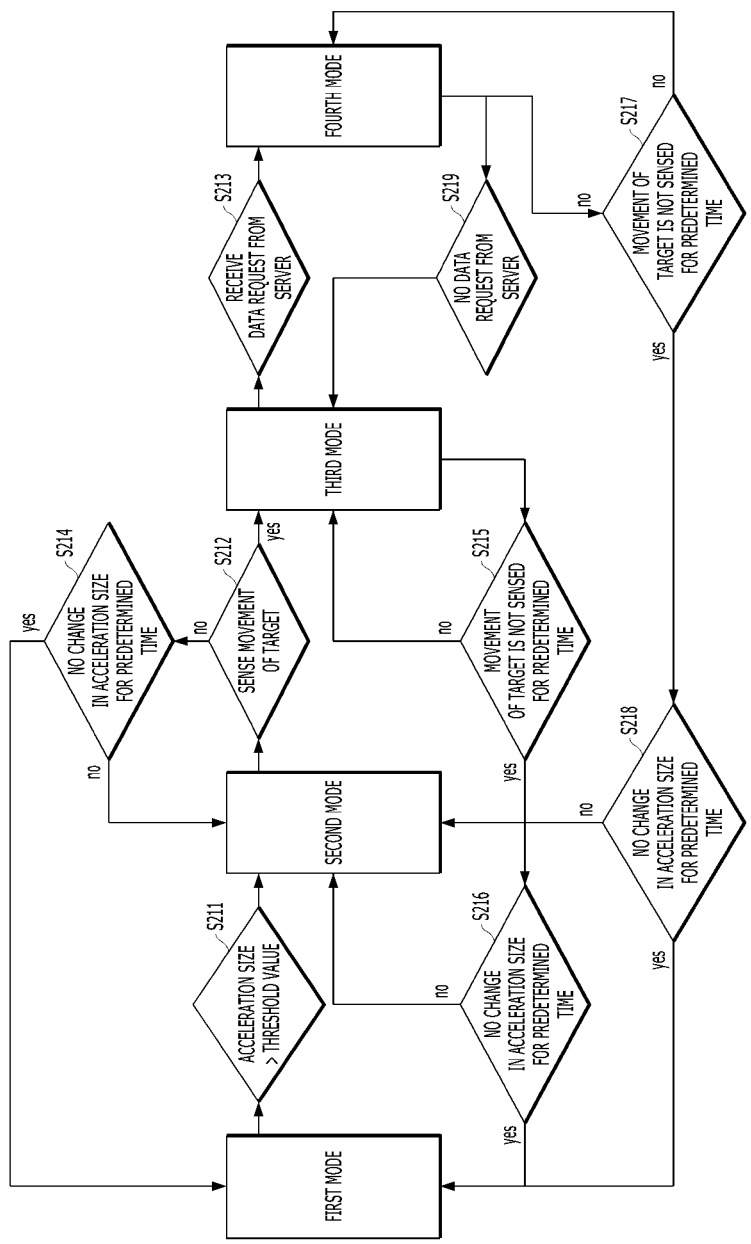
[FIG. 3]

[FIG. 4]
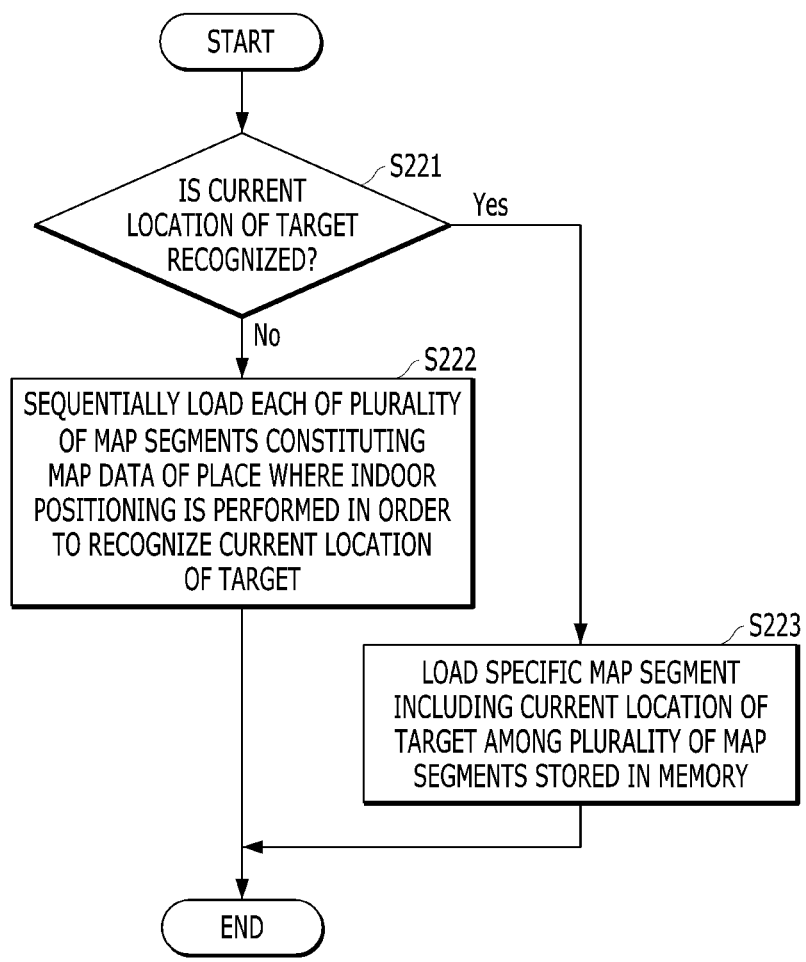

[FIG. 5]
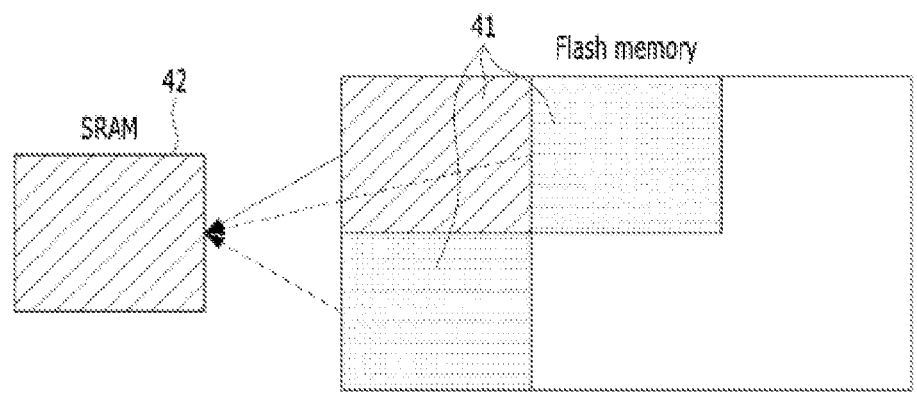

[FIG. 6]
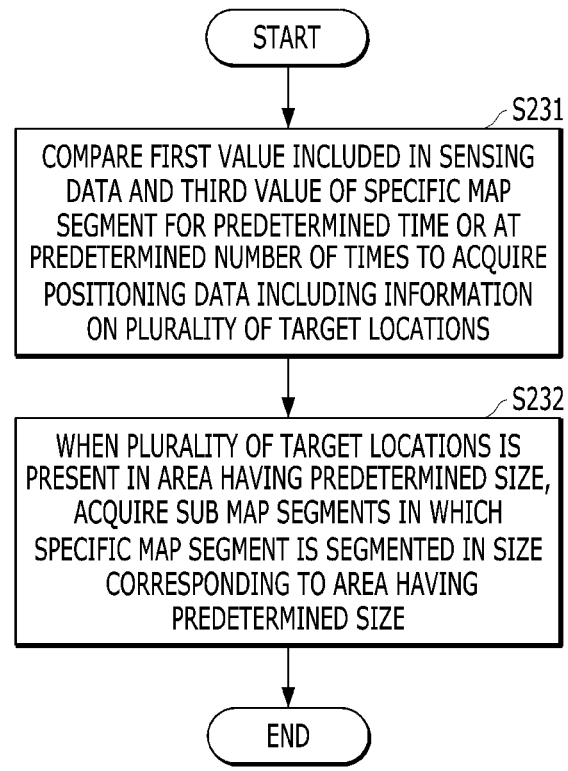

[FIG. 7]
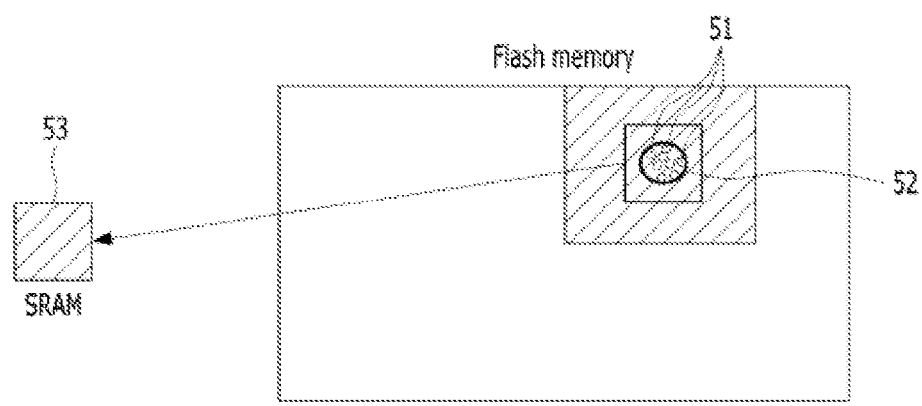

[FIG. 8]
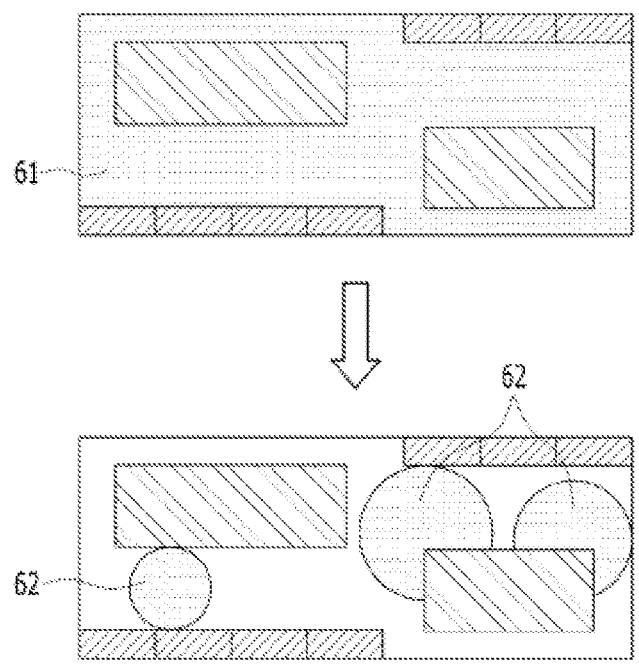

[FIG. 9]
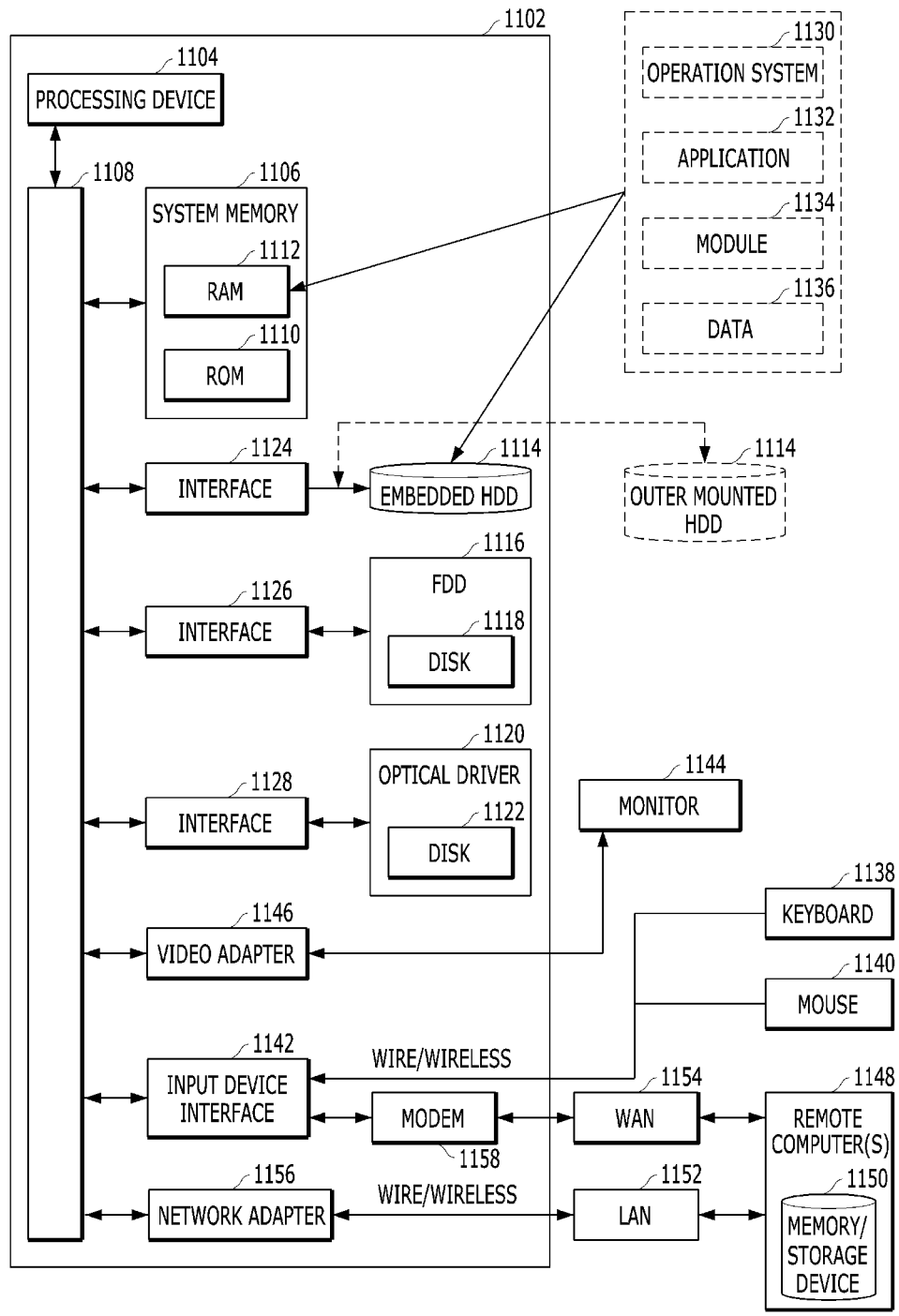

LOW-POWER METHOD AND MAP DATA HIERARCHICAL SEGMENTATION LOAD METHOD FOR INDOOR POSITIONING

CROSS REFERENCE TO RELATED APPLICATIONS

This application is a U.S. National Stage Application of International Application No. PCT/KR2022/000062, filed on Jan. 4, 2022, which claims the benefit under 35 USC 119 (a) and 365(b) of Korean Patent Application No. 10-2021-0109381 filed on Aug. 19, 2021, in the Korean Intellectual Property Office, the entire disclosure of which is incorporated herein by reference for all purposes.

TECHNICAL FIELD

The present disclosure relates to a low-power method and a map data hierarchical segmentation load method for indoor positioning, and particularly, to a method for performing indoor positioning with low power and low memory through operation mode determination and map data segmentation loading.

BACKGROUND ART

Earth magnetic field and RF-based indoor positioning estimates a current location through comparison between a magnetic field map and a radio map which are precollected, and data collected in real time. A device for the indoor positioning should be basically equipped with an IMU sensor, an RF module, etc., and as the device for the indoor positioning, a smart device such as a smartphone, a tablet PC, etc., is primarily used. However, the use of the smart device for the indoor positioning may be inefficient in terms of cost, weight, and power consumption. Further, it may be impossible to provide an indoor positioning based service using the smart device in a region or a place where carrying the smart device is impossible, such as a factory, a hospital, etc.

Therefore, even in an environment in which carrying the smart device is impossible, a need for a device capable of the indoor positioning is required.

For example, when the indoor positioning is performed with an embedded type small device instead of the smart device, it is possible to provide an indoor position based service regardless of a constraint of the smart device. However, there is a problem in that since the small device is in the form of an embedded system, a capacity of a battery is small and the capacity of the memory is small as compared with the smart device.

Therefore, there may be a demand for technology capable of efficiently using the small device for performing the indoor positioning in the art.

In this regard, Korean Patent Registration No. 10-1871052 discloses a hybrid indoor positioning system and a method thereof.

DISCLOSURE

Technical Problem

The present disclosure has been made in an effort to provide a method for performing indoor positioning with low power and a low memory through operation mode determination and map data segmentation loading.

However, technical objects of the present disclosure are not restricted to the technical object mentioned as above. Other unmentioned technical objects will be apparently appreciated by those skilled in the art by referring to the following description.

Technical Solution

An embodiment of the present disclosure provides a low power and low memory based indoor positioning method performed by a computing device including at least one processor. The method may include: determining an operation mode to be executed based on at least one of a motion of a target and movement of the target; loading a map segment related to a current location of the target from a memory when executing a specific mode related to performing indoor positioning; and acquiring positioning data by using sensing data collected in real time for the indoor positioning, and the map segment.

Further, the operation mode may include at least one of a first mode of sensing the motion of the target, a second mode of sensing the movement of the target, a third mode of sensing the movement of the target and performing the indoor positioning, and a fourth mode of sensing the movement of the target and performing the indoor positioning, and transmitting positioning data to the server.

Further, when the movement of the target is sensed, the third mode may be executed, when the positioning data is transmitted to the server after the third mode is executed, the fourth mode may be executed, and the specific mode related to performing the indoor positioning may include the third mode and the fourth mode.

Further, the map segment may be a segment in which map data of a place where the indoor positioning is performed is segmented into a predetermined data size, and the predetermined data size may correspond to a size of a cache memory for performing the indoor positioning.

Further, the loading of the map segment related to the current location of the target from the memory when executing the specific mode related to performing the indoor positioning may include sequentially loading each of a plurality of map segments constituting the map data of the place where the indoor positioning is performed in order to recognize the current location of the target when the current location of the target is not recognized.

Further, the acquiring of the positioning data by using the sensing data collected in real time for the indoor positioning, and the map segment may include comparing a first value included in the sensing data and a second value of each of the plurality of map segments loaded sequentially to acquire the positioning data including information on the current location of the target.

Further, the loading of the map segment related to the current location of the target from the memory when executing the specific mode related to performing the indoor positioning may include loading a specific map segment including the current location of the target among the plurality of map segments stored in the memory when the current location of the target is recognized.

Further, the acquiring of the positioning data by using the sensing data collected in real time for the indoor positioning, and the map segment may include comparing the first value included in the sensing data and a third value of the specific map segment for a predetermined time or at a predetermined number of times to acquire positioning data including information on a plurality of target locations.

Further, the method may further include, when the plurality of target locations is present in an area having a predetermined size, acquiring sub map segments in which the specific map segment is segmented in a size corresponding to the area having the predetermined size.

Further, the acquiring of the positioning data by using the sensing data collected in real time for the indoor positioning, and the map segment may include comparing the first value included in the sensing data and a fourth value of the sub map segment to acquire positioning data including information on a real-time location of the target.

Further, the loading of the map segment related to the current location of the target from the memory when executing the specific mode related to performing the indoor positioning may include loading a specific map segment including the current location of the target among the plurality of map segments stored in the memory based on an external signal.

Further, the loading of the specific map segment including the current location of the target among the plurality of map segments stored in the memory based on the external signal may include recognizing the current location of the target based on at least one of a first ID for distinguishing an area included in the external signal and a second ID for distinguishing the floor, and loading the specific map segment including the current location of the target from the memory.

Technical solving means which can be obtained in the present disclosure are not limited to the aforementioned solving means and other unmentioned solving means will be clearly understood by those skilled in the art from the following description.

Advantageous Effects

According to an embodiment of the present disclosure, a method for performing indoor positioning with low power and a low memory by reducing power and a memory required for performing the indoor positioning can be provided.

Effects which can be obtained in the present disclosure are not limited to the aforementioned effects and other unmentioned effects will be clearly understood by those skilled in the art from the following description.

DESCRIPTION OF DRAWINGS

Various aspects are now described with reference to the drawings and like reference numerals are generally used to designate like elements. In the following exemplary embodiments, for the purpose of description, multiple specific detailed matters are presented to provide general understanding of one or more aspects. However, it will be apparent that the aspect(s) can be executed without the detailed matters.

FIG. 1 is a block diagram of a computing device in which various aspects of the present disclosure may be implemented.

FIG. 2 is a flowchart for describing an example of a method for indoor positioning based on low power and low memory according to some exemplary embodiments of the present disclosure.

FIG. 3 is a flowchart for describing an example of an operation mode execution order according to some exemplary embodiments of the present disclosure.

FIG. 4 is a flowchart for describing an example of a method for loading a map segment from a memory according to some exemplary embodiments of the present disclosure.

FIG. 5 is a diagram illustrating an example of a map segment according to some exemplary embodiments of the present disclosure.

FIG. 6 is a diagram for describing an example of a method for acquiring a sub map segment according to some exemplary embodiments of the present disclosure.

FIG. 7 is a diagram illustrating an example of a sub map segment according to some exemplary embodiments of the present disclosure.

FIG. 8 is a diagram illustrating an example of map data to be loaded to perform indoor positioning according to some exemplary embodiments of the present disclosure.

FIG. 9 illustrates a simple and general schematic view of an exemplary computing environment in which the embodiments of the present disclosure may be implemented.

BEST MODE

Various exemplary embodiments and/or aspects will be now disclosed with reference to drawings. In the following description, for the purpose of a description, multiple detailed matters will be disclosed in order to help comprehensive appreciation of one or more aspects. However, those skilled in the art of the present disclosure will recognize that the aspect(s) can be executed without the detailed matters. In the following disclosure and the accompanying drawings, specific exemplary aspects of one or more aspects will be described in detail. However, the aspects are exemplary and some of various methods in principles of various aspects may be used and the descriptions are intended to include all of the aspects and equivalents thereof. Specifically, in "embodiment", "example", "aspect", "illustration", and the like used in the specification, it may not be construed that a predetermined aspect or design which is described is more excellent or advantageous than other aspects or designs.

Further, various aspects and features will be presented by a system which can include one or more apparatuses, terminals, servers, devices, components, and/or modules. It should also be appreciated and recognized that various systems can include additional apparatuses, terminals, servers, devices, components, and/or modules and/or that the various systems cannot include all of apparatuses, terminals, servers, devices, components, modules, and the like discussed in association with the drawings.

"Computer program", "component", "module", "system", and the like which are terms used in this specification may be used to be compatible with each other and refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers.

Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

Hereinafter, like reference numerals refer to like or similar elements regardless of reference numerals and a duplicated description thereof will be omitted. Further, in describing an embodiment disclosed in the present disclosure, a detailed description of related known technologies will be omitted if it is determined that the detailed description makes the gist of the embodiment of the present disclosure unclear. Further, the accompanying drawings are only for easily understanding the embodiment disclosed in this specification and the technical spirit disclosed by this specification is not limited by the accompanying drawings.

The terminology used in this specification is for the purpose of describing embodiments only and is not intended to limit the present disclosure. In the present disclosure, the singular form also includes the plural form, unless the context indicates otherwise. It is to be understood that the terms "comprise" and/or "comprising" used in the present disclosure does not exclude the presence or addition of one or more other components other than stated components.

Although the terms "first", "second", and the like are used for describing various elements or components, these elements or components are not confined by these terms, of course. These terms are merely used for distinguishing one element or component from another element or component. Therefore, a first element or component to be mentioned below may be a second element or component in a technical spirit of the present disclosure.

Unless otherwise defined, all terms (including technical and scientific terms) used in the present specification may be used as the meaning which may be commonly understood by the person with ordinary skill in the art, to which the present disclosure pertains. Terms defined in commonly used dictionaries should not be interpreted in an idealized or excessive sense unless expressly and specifically defined.

Moreover, the term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

Further, the terms "information" and "data" used in the specification may also be often used to be exchanged with each other.

Suffixes "module" and "unit" for components used in the following description are given or mixed in consideration of easy preparation of the specification only and do not have their own distinguished meanings or roles.

The objects and effects of the present disclosure, and technical constitutions of accomplishing these will become obvious with reference to exemplary embodiments to be described below in detail along with the accompanying drawings. In describing the present disclosure, a detailed description of known function or constitutions will be omitted if it is determined that it unnecessarily makes the gist of the present disclosure unclear. In addition, terms to be described below as terms which are defined in consideration of functions in the present disclosure may vary depending on the intention of a user or an operator or usual practice.

However, the present disclosure is not limited to exemplary embodiments disclosed below but may be implemented in various different forms. However, the embodiments are provided to make the present disclosure be complete and completely announce the scope of the present disclosure to those skilled in the art to which the present disclosure belongs and the present disclosure is just defined by the scope of the claims. Accordingly, the terms need to be defined based on contents throughout this specification.

The scope of the operations in the claims of the present disclosure arises from the functions and features described in respective steps and is not affected by the order in which respective steps in the claims are disclosed if a sequence relationship of the disclosed order in respective steps constituting the method is not specified. For example, in the claims set forth in the step including steps A and B, the scope of rights is not limited to the fact that step A should precede step B, even if step A is described before step B.

FIG. 1 is a block diagram of a computing device in which various aspects of the present disclosure may be implemented.

In some exemplary embodiments of the present disclosure, the computing device 100 may include a processor 110, a communication unit 120, a memory 130, and a sensor unit 140. However, components described above are not required in implementing the computing device 100, so the computing device 100 may have components more or less than components listed above.

According to some exemplary embodiments of the present disclosure, the computing device 100 may be an embedded system for performing indoor positioning. However, the present disclosure is not limited thereto.

The computing device 100 may include a predetermined type computer system or computer device such as an embedded, a microprocessor, a main frame computer, a digital processor, a portable device, and a device controller. However, the present disclosure is not limited thereto.

The processor 110 of the computing device 100 generally controls an overall operation of the computing device 100. The processor 110 processes a signal, data, information, and the like input or output through the components or drives the application program stored in the memory 130 to provide or process information or a function appropriate for the user.

Further, the processor 110 may control at least some of the components of the computing device 100 in order to drive the application program stored in the memory 130. Furthermore, the processor 110 may combine and operate at least two of the components included in the computing device 100 in order to drive the application program.

According to some exemplary embodiments of the present disclosure, the processor 110 may determine an operation mode to be executed based on at least one of a motion of a target and movement of the target. Further, when the processor 110 executes a specific mode related to performing the indoor positioning, the processor 110 may load a map segment related to a current location of the target from a memory. In addition, the processor 110 may acquire positioning data by using sensing data collected in real time and the map segment for the indoor positioning. Here, the operation mode may be associated with an operation of activating or deactivating some modules (or functions) in order to perform the indoor positioning with low power. In addition, the map segment may be a segment in which map data of a place where the indoor positioning is performed is segmented into a predetermined data size. In addition, the predetermined data size may correspond to a size of a cache memory for performing the indoor positioning. The cache memory may be a memory in which data for performing the indoor positioning by the processor 110 or result data of performing the indoor positioning is recorded.

Hereinafter, a method in which the processor 110 of the computing device 100 acquires positioning data by using the map segment will be described below with reference to FIGS. 2 to 6.

The communication unit 120 of the computing device 100 may include one or more modules which enable communication between the computing device 100 and a server (e.g., positioning data analysis server or positioning data based service providing server) and between the computing device 100 and the user terminal. In addition, the communication unit 120 may include one or more modules that connect the computing device 100 to one or more networks.

According to some exemplary embodiments of the present disclosure, the communication unit 120 may receive a positioning data request signal from the server. Further, the communication unit 120 may transmit the positioning data to the server. For example, the processor 110 of the computing device 100 may control the communication unit 120 to transmit the positioning data to the server in order to receive a location based service (e.g., an indoor navigation service) provided from the server. However, the present disclosure is not limited thereto.

A network which connects communication between the computing device 100 and the user terminal and between the computing device 100 and the server may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

Further, the network presented here may use various wireless communication systems such as code division multi access (CDMA), time division multi access (TDMA), frequency division multi access (FDMA), orthogonal frequency division multi access (OFDMA), single carrier-FDMA (SC-FDMA), and other systems.

The network according to the embodiments of the present disclosure may be configured regardless of communication modes such as wired and wireless modes and constituted by various communication networks including a local area network (LAN), a wide area network (WAN), and the like. Further, the network may be known World Wide Web (WWW) and may adopt a wireless transmission technology used for short-distance communication, such as infrared data association (IrDA) or Bluetooth.

The techniques described in this specification may also be used in other networks in addition to the aforementioned networks.

The memory 130 of the computing device 100 may store a program for an operation of the processor 110 and temporarily or persistently store input/output data. Further, the memory 130 may store the map data or a map segment used for the indoor positioning. The memory 130 may include at least one type of storage medium of a flash memory type, a hard disk type, a multimedia card micro type, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Various embodiments described herein may be implemented in a recording medium and a storage medium readable by a computer or a device similar to the computer by using, for example, software, hardware, or a combination thereof.

According to hardware implementation, the embodiment described herein may be implemented by using at least one of the application specific integrated circuits (ASICs), the digital signal processors (DSPs), the digital signal processing devices (DSPDs), the programmable logic devices (PLDs), the field programmable gate arrays (FPGAs), the processors, the controllers, the micro-controllers, the microprocessors, and the electric units for performing other functions. In some cases, the embodiments described in the specification may be implemented by the processor 110 itself of the computing device 100.

According to software implementation, embodiments such as a procedure and a function described in the present disclosure may be implemented by separate software modules. Each of the software modules may perform one or more functions and operations described in the specification. A software code may be implemented by a software application written by an appropriate program language. The software code may be stored in the memory 130 of the computing device 100 and executed by the processor 110 of the computing device 100.

FIG. 2 is a flowchart for describing an example of a method for indoor positioning based on low power and low memory according to some exemplary embodiments of the present disclosure. FIG. 3 is a flowchart for describing an example of an operation mode execution order according to some exemplary embodiments of the present disclosure. FIG. 4 is a flowchart for describing an example of a method for loading a map segment from a memory according to some exemplary embodiments of the present disclosure. FIG. 5 is a diagram illustrating an example of a map segment according to some exemplary embodiments of the present disclosure.

Referring to FIG. 2, the processor 110 of the computing device 100 may determine an operation mode to be executed based on at least one of a motion of a target (i.e., the computing device 100) and movement of the target before performing indoor positioning (S210).

The operation mode according to some exemplary embodiments of the present disclosure may include at least one of a first mode of sensing the motion of the target, a second mode of sensing the movement of the target, a third mode of sensing the movement of the target and performing the indoor positioning, and a fourth mode of sensing the movement of the target and performing the indoor positioning, and transmitting positioning data to a server.

Specifically, FIG. 3 illustrates an example of an execution order of an operation mode in which it is assumed that an initially set mode is the first mode.

Referring to FIG. 3, the processor 110 of the computing device 100 executes the first mode to sense the motion of the target. When a size of an acceleration exceeds a predetermined threshold (i.e., it is recognized that the target moves) (S211), the processor 110 may execute the second mode.

The processor 110 of the computing device 100 executes the second mode to sense the movement of the target. When the processor 110 senses the movement of the target (S212), the processor 110 may execute the third mode.

Meanwhile, when the movement of the target is not sensed, and there is no change in size of the acceleration for a predetermined time (Yes in S214), the processor 110 executing the second mode may execute the first mode.

On the other hand, when the movement of the target is not sensed, and there is the change in size of the acceleration for the predetermined time (No in S214), the processor 110 executing the second mode may execute the second mode as it is.

The processor 110 of the computing device 100 executes the third mode to sense the movement of the target and perform the indoor positioning. When the processor 110 receives a data request from the server (S213), the processor 110 may execute the fourth mode.

When the movement of the target is not sensed for a predetermined time (Yes in S215), the processor 110 executing the third mode may identify whether there is no change in size of the acceleration for the predetermined time. As an example, when the movement of the target is not sensed for the predetermined time, and there is no change in size of the acceleration (Yes in S216), the processor 110 may execute the first mode. As another example, when the movement of the target is not sensed for the predetermined time, and there is the change in size of the acceleration (No in S216), the processor 110 may execute the second mode.

On the other hand, when the movement of the target is sensed for the predetermined time (No in S215), the processor 110 executing the third mode may execute the third mode as it is.

The processor 110 of the computing device 100 executes the fourth mode to sense the movement of the target and perform the indoor positioning, and transmit the positioning data to the server. When the processor 110 does not receive the data request from the server (S219), the processor 110 may execute the third mode.

When the movement of the target is not sensed for a predetermined time (Yes in S217), the processor 110 executing the fourth mode may identify whether there is no change in size of the acceleration for the predetermined time. As an example, when the movement of the target is not sensed for the predetermined time, and there is no change in size of the acceleration (Yes in S218), the processor 110 may execute the first mode. As another example, when the movement of the target is not sensed for the predetermined time, and there is the change in size of the acceleration for the predetermined time (No in S218), the processor 110 may execute the second mode.

On the other hand, when the movement of the target is sensed for the predetermined time (No in S217), the processor 110 executing the fourth mode may execute the fourth mode as it is.

Referring back to FIG. 2, when the processor 110 of the computing device 100 executes the specific mode related to performing the indoor positioning, the processor 110 may load the map segment related to the current location of the target from the memory 130 (S220). In addition, the processor 110 may acquire positioning data by using sensing data collected in real time and the map segment for the indoor positioning (S230).

Specifically, when the movement of the target is sensed, the processor 110 may execute the third mode and when transmitting the positioning data to the server after the third mode is executed, the processor 110 may execute the fourth mode. That is, the specific mode related to performing the indoor positioning may include the third mode and the fourth mode. In addition, when the processor 110 executes the third mode or the fourth mode, the processor 110 may load the map segment related to the current location of the target from the memory 130.

Here, the map segment may be a segment in which map data of a place where the indoor positioning is performed is segmented into a predetermined data size. In addition, the predetermined data size may correspond to a size of a cache memory for performing the indoor positioning. The cache memory may be a memory in which data for performing the indoor positioning by the processor 110 or result data acquired by performing the indoor positioning is recorded.

When loading the map segment related to the current location of the target from the memory 130, the processor 110 of the computing device 100 may load the map segment from the memory 130 by another method according to whether to recognize the current location of the target.

Specifically, referring to FIG. 4, when the processor 110 of the computing device 100 does not recognize the current location of the target (No in S211), the processor 110 may sequentially load each of a plurality of map segments constituting the map data of the place where the indoor positioning is performed in order to recognize the current location of the target (S222).

In this case, when acquiring the positioning data, the processor 110 compares a first value included in the sensing data collected in real time and a second value of each of the plurality of map segments loaded sequentially to acquire the positioning data including information on the current location of the target.

For example, referring to FIG. 5, the processor 110 loads one map segment 42 among a plurality of map segments 41, and then compares the first value included in the sensing data and the second value of the map segment 42 to generate the positioning data including the information on the current location of the target. However, the present disclosure is not limited thereto.

As described above with reference to FIGS. 2 to 5, the computing device 100 of the present disclosure may execute one operation mode to minimize power consumption among a plurality of operation modes in order to implement a low power based indoor positioning system. In this case, the computing device 100 of the present disclosure may reduce the amount of power required for the indoor positioning.

Further, the computing device 100 of the present disclosure may segment and load the map data into the map segments in order to implement a low memory (here, cache memory) based indoor positioning system. In this case, the computing device 100 of the present disclosure may reduce a cache memory capacity required for the indoor positioning.

Therefore, the computing device 100 of the present disclosure may perform the indoor positioning with the low power and the low memory. In this case, the indoor positioning is performed by the indoor positioning system configured in the embedded type small device to perform the indoor positioning even in an environment in which carrying the smart device is impossible.

Meanwhile, referring back to FIG. 4, when the processor 110 of the computing device 100 recognizes the current location of the target (Yes in S211), the processor 110 may load a specific map segment including the current location of the target among the plurality of map segments stored in the memory 130 (S223).

In this case, the processor 110 may load additionally segmented sub map segments from the memory 130 according to the position of the target being converged. In addition, when acquiring the positioning data, the processor 110 compares the first value included in the sensing data collected in real time and a fourth value of the sub map segment to acquire the positioning data including the information on the current location of the target. Here, the sub map segment may have a size corresponding to a movement radius of the target. However, the present disclosure is not limited thereto. Hereinafter, a method in which the processor 110 of the computing device 100 loads the sub map segment from the memory 130 will be described below with reference to FIGS. 6 to 8.

According to some additional exemplary embodiments of the present disclosure, in relation to step S220, when the processor 110 of the computing device 100 executes the specific mode related to performing the indoor positioning, the processor 110 may load the specific map segment including the current location of the target among the plurality of map segments stored in the memory 130 based on an external signal. Here, the external signal may be provided only to a specific area of the indoor positioning place. For example, the external signal may be service set id (ssid) of wifi for each floor. However, the present disclosure is not limited thereto.

Specifically, the processor 110 may recognize the current location of the target based on at least one of a first ID for distinguishing an area included in the external signal and a second ID for distinguishing the floor. In addition, the processor 110 may load the specific map segment including the current location of the target from the memory.

Therefore, the computing device 100 of the present disclosure may implement the low power based indoor positioning system by reducing the load used for determining the current location of the target by using the external signal.

FIG. 6 is a diagram for describing an example of a method for acquiring a sub map segment according to some exemplary embodiments of the present disclosure. FIG. 7 is a diagram illustrating an example of a sub map segment according to some exemplary embodiments of the present disclosure. FIG. 8 is a diagram illustrating an example of map data to be loaded to perform indoor positioning according to some exemplary embodiments of the present disclosure.

Referring to FIG. 6, the processor 110 of the computing device 100 compares the first value included in the sensing data and a third value of the specific map segment including the current location of the target for a predetermined time or at a predetermined number of times to acquire positioning data including information on a plurality of target locations (S231).

When the plurality of target locations is present in an area having a predetermined size, the processor 110 of the computing device 100 may acquire sub map segments in which the specific map segment is segmented in a size corresponding to the area having the predetermined size (S232).

For example, referring to FIG. 7, the processor 110 of the computing device 100 compares the first value and the second value for a predetermined time (e.g., five minutes) or at a predetermined number of times (e.g., 8) to acquire positioning data including information on a plurality of target locations (e.g., 8 locations).

In addition, when the plurality of target locations 51 is present in an area 52 having a predetermined size, the processor 110 may acquire sub map segments 53 in which the specific map segment is segmented in a size corresponding to the area having the predetermined size.

In this case, in order to acquire the positioning data, the processor 110 compares the first value included in the sensing data collected in real time and a fourth value of the sub map segment 53 to acquire positioning data including information on a real-time location of the target.

The computing device 100 of the present disclosure segments and loads the map data into the map segments and loads sub map segments acquired by additionally segmenting the map segment to perform the indoor positioning in order to implement the low memory (here, cache memory) based indoor positioning system.

Specifically, referring to FIG. 8, the computing device 100 may perform the indoor positioning by loading only map data 62 of an area (i.e., an anticipated movement radius of the target) smaller than an area (i.e., an entire area) of existing map data 61 to be loaded to perform the indoor positioning. In this case, the computing device 100 of the present disclosure may further reduce a cache memory capacity required for the indoor positioning.

Therefore, the computing device 100 of the present disclosure may perform the indoor positioning with the low memory. In this case, the indoor positioning is performed by the indoor positioning system configured in the embedded type small device to perform the indoor positioning even in an environment in which carrying the smart device is impossible.

FIG. 9 is a general schematic view of an exemplary computing environment in which exemplary embodiments of the present disclosure may be implemented.

The present disclosure has generally been described above in association with a computer executable command which may be executed on one or more computers, but it will be well appreciated by those skilled in the art that the present disclosure can be implemented through a combination with other program modules and/or as a combination of hardware and software.

In general, the module in the present specification includes a routine, a procedure, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. The computer includes, as a computer accessible medium, volatile and non-volatile media, transitory and non-transitory media, and mobile and non-mobile media. As a non-limiting example, the computer readable media may include both computer readable storage media and computer readable transmission media.

The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable instruction, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an internal hard disk drive (HDD) 1114 (for example, EIDE and SATA)—the internal hard disk drive 1114 may also be configured for an external purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD). The hard disk drive 1114, the magnetic disk drive 1116, and the optical disk drive 1120 may be connected to the system bus 1108 by a hard disk drive interface 1124, a magnetic disk drive interface 1126, and an optical disk drive interface 1128, respectively. An interface 1124 for implementing an external drive includes, for example, at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable storage media, the mobile optical media such as the HDD, the mobile magnetic disk, and the CD or the DVD are mentioned, but it will be well appreciated by those skilled in the art that other types of storage media readable by the computer such as a zip drive, a magnetic cassette, a flash memory card, a cartridge, and others may also be used in an exemplary operating environment and further, the predetermined media may include computer executable instructions for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a server computer, a router, a personal computer, a portable computer, a microprocessor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158, is connected to a communication server on the WAN 1154, or has other means that configure communication through the WAN 1154 such as the Internet, etc. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various embodiments presented herein may be implemented as manufactured articles using a method, a device, or a standard programming and/or engineering technique. The term "manufactured article" includes computer programs or media which are accessible by a predetermined computer-readable device. For example, a computer readable storage media includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. The term "machine-readable media" includes a wireless channel and various other media that can store, possess, and/or transfer instruction(s) and/or data, but is not limited thereto.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be interpreted within the widest range which is coherent with the principles and new features presented herein.

Mode for Disclosure

Related contents in the best mode for carrying out the present disclosure are described as above.

Industrial Applicability

The present disclosure can be used for a small device, a system, etc., for performing the indoor positioning.

The invention claimed is:

1. A low power and low memory based indoor positioning method performed by a computing device including at least one processor, the method comprising:
   determining an operation mode to be executed based on at least one of a motion of a target and movement of the target sensed by a sensor;
   loading a map segment related to a current location of the target from a memory when executing a specific mode related to performing indoor positioning; and
   acquiring positioning data by using sensing data collected in real time for the indoor positioning, and the map segment,
   wherein the operation mode includes deactivating functions of the computing device while acquiring the positioning data,
   wherein the map segment is part of a hierarchical segmentation structure of map data comprising macro-segments and micro-segments, and
   wherein the loading includes retrieving a macro-segment based on a coarse location estimate followed by a micro-segment based on proximity data and real-time sensing information, and
   wherein the loading of the map segment is further based on external signal comprising a service set id (SSID) or Wi-Fi each floor.

2. The low power and low memory based indoor positioning method of claim 1, wherein the operation mode includes at least one of a first mode of sensing the motion of the target, a second mode of sensing the movement of the target, a third mode of sensing the movement of the target and performing the indoor positioning, and a fourth mode of sensing the movement of the target and performing the indoor positioning and transmitting positioning data to a server which is external to the computing device and each mode corresponds to a different level of system activation and map segment granularity.

3. The low power and low memory based indoor positioning method of claim 2, wherein when the movement of the target is sensed, the third mode is executed, when the positioning data is transmitted to the server after the third mode is executed, the fourth mode is executed, and the specific mode related to performing the indoor positioning includes the third mode and the fourth mode, wherein a transition to the fourth mode is triggered based on both motion history and an external red test signal.

4. The low power and low memory based indoor positioning method of claim 1, wherein the map segment is a segment in which map data of a place where the indoor positioning is performed is segmented into a predetermined data size, and the predetermined data size corresponds to a size of a cache memory for performing the indoor positioning.

5. The low power and low memory based indoor positioning method of claim 1, wherein the loading of the map segment related to the current location of the target from the memory when executing the specific mode related to performing the indoor positioning includes sequentially loading each of a plurality of map segments constituting the map data of the place where the indoor positioning is performed in order to recognize the current location of the target when the current location of the target is not recognized.

6. The low power and low memory based indoor positioning method of claim 5, wherein the acquiring of the positioning data by using the sensing data collected in real time for the indoor positioning, and the map segment includes comparing a first value included in the sensing data and a second value of each of the plurality of map segments loaded sequentially to acquire the positioning data including information on the current location of the target.

7. The low power and low memory based indoor positioning method of claim 1, wherein the loading of the map segment related to the current location of the target from the memory when executing the specific mode related to performing the indoor positioning includes loading a specific map segment including the current location of the target among the plurality of map segments stored in the memory when the current location of the target is recognized.

8. The low power and low memory based indoor positioning method of claim 7, wherein the acquiring of the positioning data by using the sensing data collected in real time for the indoor positioning, and the map segment includes comparing the first value included in the sensing data and a third value of the specific map segment for a predetermined time or at a predetermined number of times to acquire positioning data including information on a plurality of target locations.

9. The low power and low memory based indoor positioning method of claim 8, further comprising:

when the plurality of target locations is present in an area having a predetermined size, acquiring sub map segments in which the specific map segment is segmented in a size corresponding to the area having the predetermined size.

10. The low power and low memory based indoor positioning method of claim 9, wherein the acquiring of the positioning data by using the sensing data collected in real time for the indoor positioning, and the map segment includes comparing the first value included in the sensing data and a fourth value of the sub map segment to acquire positioning data including information on a real-time location of the target.

11. The low power and low memory based indoor positioning method of claim 1, wherein the loading of the map segment related to the current location of the target from the memory when executing the specific mode related to performing the indoor positioning includes loading a specific map segment including the current location of the target among the plurality of map segments stored in the memory based on an external signal.

12. The low power and low memory based indoor positioning method of claim 11, wherein the loading of the specific map segment including the current location of the target among the plurality of map segments stored in the memory based on the external signal includes recognizing the current location of the target based on at least one of a first ID for distinguishing an area included in the external signal and a second ID for distinguishing the floor, and loading the specific map segment including the current location of the target from the memory.

13. An indoor positioning method executed by a device including at least one processor, the method comprising:

determining, using a sensor, motion of the device;

if it is determined that the motion of the device exceeds a predetermined threshold, determining, using the sensor, movement of the device;

if movement of the device is sensed for a predetermined time, deactivating certain functions of the device before performing indoor positioning of the device by loading a map segment of a predetermined size which corresponds to a current location of the device from a memory of the device, wherein the size of the map segment corresponds to a size of the memory of the device; and transmitting positioning data of the device to a server, wherein the map segment is selected from a hierarchical segment free based on a movement pattern profile and signal-derived metadata.

* * * * *